United States Patent
Rothenberg et al.

(10) Patent No.: US 10,280,276 B2
(45) Date of Patent: May 7, 2019

(54) PROCESS FOR PREPARING FOAMED POLYMER

(71) Applicant: Plantics B.V., Arnhem (NL)

(72) Inventors: Gad Rothenberg, Amsterdam (NL); Albert Hendrikus Alberts, Amsterdam (NL)

(73) Assignee: Plantics B.V., Arnhem (NL)

( * ) Notice: Subject to any disclaimer, the term of this patent is extended or adjusted under 35 U.S.C. 154(b) by 191 days.

(21) Appl. No.: 14/378,770

(22) PCT Filed: Feb. 18, 2013

(86) PCT No.: PCT/EP2013/053147
§ 371 (c)(1),
(2) Date: Aug. 14, 2014

(87) PCT Pub. No.: WO2013/121033
PCT Pub. Date: Aug. 22, 2013

(65) Prior Publication Data
US 2015/0005403 A1 Jan. 1, 2015

Related U.S. Application Data

(60) Provisional application No. 61/599,957, filed on Feb. 17, 2012.

(30) Foreign Application Priority Data

Feb. 17, 2012 (EP) .................................... 12155925

(51) Int. Cl.
C08J 9/34 (2006.01)
C08J 9/228 (2006.01)
(Continued)

(52) U.S. Cl.
CPC .............. *C08J 9/228* (2013.01); *C08G 63/12* (2013.01); *C08J 9/02* (2013.01); *C08J 9/34* (2013.01);
(Continued)

(58) Field of Classification Search
CPC ..... C08J 9/228; C08J 9/34; C08J 5/12; C08G 63/12
See application file for complete search history.

(56) References Cited

U.S. PATENT DOCUMENTS 8,524,855 B1 * 9/2013 Tisserat ................. C08G 63/12
528/176
2011/0159113 A1 6/2011 Adeli
2011/0224323 A1 9/2011 Bigwood

FOREIGN PATENT DOCUMENTS

CN 101328259 12/2008
EP 2 444 441 A1 4/2012
(Continued)

OTHER PUBLICATIONS

International Search Report for International Application No. PCT/EP2013/053147, "Process for Preparing Foamed Polymer", dated May 22, 2013.
(Continued)

*Primary Examiner* — Kara B Boyle
(74) *Attorney, Agent, or Firm* — Hamilton, Brook, Smith & Reynolds, P.C.

(57) ABSTRACT

The invention pertains to a process for manufacturing a glycerol-tricarboxylic acid polyester foam which comprises the steps of combining glycerol and a tri-carboxylic acid to provide a liquid reaction mixture and contacting the reaction mixture with a substrate under polymerization conditions, wherein the substrate has a top layer comprising one or more of metal, metal oxide, and metal halide. The invention also pertains to a glycerol-tricarboxylic polyester foam, in par-
(Continued)

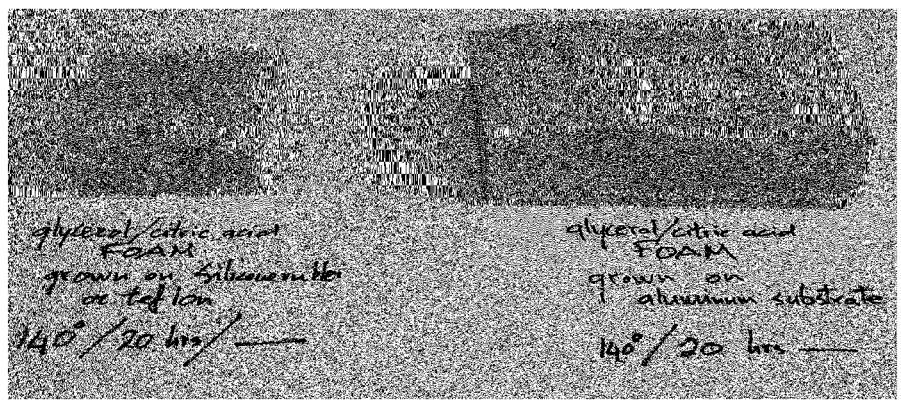

ticular a glycerol-citric acid polyester foam, which has a closed cell foam structure wherein at least 90 vol. % of the foam, preferably at least 95% of the foam, is built up from cells having a diameter below 2 mm. The foamed polyester of the present invention is "green", biodegradable, and non-toxic, and can be cleanly combusted. It finds application in, int. al., packaging materials, insulation materials, and materials with a short life cycle.

15 Claims, 1 Drawing Sheet

(51) Int. Cl.
*C08J 9/02* (2006.01)
*C08G 63/12* (2006.01)

(52) U.S. Cl.
CPC .... *C08J 2205/046* (2013.01); *C08J 2205/052* (2013.01); *C08J 2300/16* (2013.01); *C08J 2367/00* (2013.01)

(56) References Cited

FOREIGN PATENT DOCUMENTS

| WO | WO 02/22724 A1 | 3/2002 |
| WO | WO 2010/059925 A1 | 9/2011 |

OTHER PUBLICATIONS

International Preliminary Report on Patentability and Written Opinion of the International Searching Authority dated Aug. 19, 2014 for International Application No. PCT/EP2013/053147, entitled "Process for Preparing Foamed Polymer".

\* cited by examiner

PROCESS FOR PREPARING FOAMED POLYMER

This application is the U.S. National Stage of International Application No. PCT/EP2013/053147, filed Feb. 18, 2013, which designates the U.S., published in English, claims priority under 35 U.S.C. §§ 119 or 365(c) to EP Application No. 12155925.6, filed Feb. 17, 2012 and claims the benefit of U.S. Provisional Application No. 61/599,957, filed on Feb. 17, 2012.

The present invention pertains to a process for preparing a foamed polymer, by reacting glycerol with a tri-carboxylic acid.

Polymer foams are known in the art for various applications, e.g., as packaging material and as insulation material.

A disadvantage of polymer foams known in the art is that they are often based on petroleum-derived sources, which means that they are not renewable, and cannot be classified as "green". A further disadvantage is that they are not biodegradable, which is of particular importance for packaging materials. A still further disadvantage is that some of the materials comprise heteroatoms or aromatic rings, which may cause issues when the material is combusted, such as the formation of SOx/NOx compounds and the release of toxic fumes or other toxic compounds into the environment.

There is therefore need for a polymer foam which solves these problems.

WO2010/059925 describes a polymer obtained by reaction of glycerol with citric acid in a two-step process. In a first step, low-molecular weight polyester pre-polymers are synthesized at a temperature of 80° C. to 250° C., which are then reacted further at a pressure at or above 1 atmosphere and a temperature of 175° C. to 400° C.

It has been found, however, that the polymer and process as described in this reference have a number of disadvantages. In particular the resulting foamed product has an irregular structure. Further, it turns out that the polymer is difficult to produce in a controlled and reproducible manner.

There is therefore need for a process for producing a glycerol tri-carboxylic acid polyester foam which results in a high-quality product, and which can be carried out in a reproducible manner. There is particular need for a process for manufacturing a foam with a regular foam structure. The present invention provides such a process.

The process according to the invention comprises the steps of combining glycerol and a tri-carboxylic acid to provide a liquid reaction mixture and contacting the reaction mixture with a substrate under polymerization conditions, wherein the substrate has a top layer comprising one or more of metal, metal oxide, and metal halide.

It has appeared that the process of the invention allows the manufacture of polyester foams from glycerol and a tri-carboxylic acid, which foams have good properties while the process can be carried out in a reproducible manner, also for large reactor volumes.

The present invention will be described in more detail below.

FIG. 1 presents a foam manufactured by the process according to the invention using an aluminium substrate (right hand side) and a foam manufactured by a comparative process on a silicone substrate (left hand side). As can be seen from the FIGURE, the foam according to the invention has a regular structure of small closed cells, while the comparative foam has an irregular structure with varying cell sizes.

Within the context of the present specification, the word foam refers to a glycerol-tricarboxylic acid polyester material with a density below 1 g/ml, specifically below 0.9 g/ml.

It has appeared that the presence of a substrate with a top layer comprising one or more of metal, metal oxide, and metal halide causes the polymer foam to have a regular structure. In one embodiment, the polymer foam has a regular structure of small, closed, cells. In another embodiment, the polymer foam has a regular reticulated structure.

The starting materials for the present invention are glycerol and a tri-carboxylic acid. The tri-carboxylic acid may be any tri-carboxylic acid which has three carboxylic acid groups and at most 15 carbon atoms. Examples include citric acid, isocitric acid, aconitic acid (both cis and trans), and 3-carboxy-cis,cis-muconic acid. The use of citric acid is considered preferable, both for reasons of costs and of availability. The citric acid can be provided in anhydrous form. However, as the presence of water is not detrimental to the process, it is possible, and may be preferred, to use citric acid monohydrate as starting material.

In one embodiment, the molar ratio between the glycerol and the tricarboxylic acid is between 1.5:1 and 1:1.5, preferably between 1.2:1 and 1:1.2, more preferably between 1.1:1 and 1:1.1. The theoretical molar ratio is 1:1.

In another embodiment, an excess amount of glycerol is used. This is believed to lead to a product with a higher flexibility. In this embodiment, the molar ratio between the glycerol and the tricarboxylic acid is higher than 1.2:1, in particular higher than 1.5:1. The molar ratio between glycerol and tricarboxylic acid may be at least 1.6:1. As a maximum value a range of 3:1 may be mentioned.

The glycerol and the tri-carboxylic acid are combined to form a liquid phase. In one embodiment this is done by mixing the components together, and where necessary adding heat, e.g., to dissolve the acid in the glycerol. This may be, for example, be effected at a temperature above 90° C. In one embodiment, the mixture may be heated and mixed for a period of 30 seconds to 2 hours, more specifically 10 minutes to 45 minutes, at a temperature of 90-180° C.

In another embodiment, water is added to the system to help in the mixing and dissolution process. If water is added, the temperature may be lower, e.g., in the range of 40° C. or higher, e.g., at a temperature of 40-100° C., in particular 50-100° C., because the water will help in the mixing process and, where necessary, dissolution process. In this embodiment, the mixture may be may be heated and mixed for a period of 5 minutes to 2 hours, more specifically 10 minutes to 45 minutes, at a temperature in the specified range.

If so desired, a polymerisation catalyst may be added to the reaction mixture. Suitable catalysts for polyester manufacture are known in the art. They include, e.g., p-toluene sulphonic ester and tin oxalate, and sulphuric acid. It is within the scope of the skilled person to select a suitable catalyst. It has been found, however, that the use of a catalyst is generally not required for the esterification reaction to proceed.

It has been found that the effect of the invention can be improved by adding a small amount of a strong acid to the reaction mixture and/or by applying a strong acid to the substrate prior to contacting the reaction mixture with the substrate. The addition of strong acid in combination with the use of a metal substrate with a toplayer of metal. metal oxide, and/or metal halide, in particular a substrate with a toplayer based on aluminium or zinc (and/or their oxides or halides), has been found to give a foam with particularly good properties, especially as regards low density and high homogeneity.

Examples of suitable strong inorganic acids are hydrochloric acid (HCl), hydroiodic acid (HI), hydrobromic acid (HBr), perchloric acid (HClO4), nitric acid (HNO3) and sulfuric acid (H2SO4). The use of hydrochloric acid is considered preferred, because it has been found to give the best results. Examples of strong organic acids are triflic acid and trihaloacetic acids, in particular trichloroacetic acid. In one embodiment the strong acid has a dissociation constant which is at least two, preferably at least orders of magnitude higher than the dissociation constant of the tricarboxylic acid. Not wishing to be bound by theory it is believed that the strong acid and the substrate toplayer together interplay to trigger the formation of a foam with a regular structure at the interlayer between substrate and reaction mixture.

The amount of strong acid that is used generally is at most 10 mol. %, calculated on the total moles tricarboxylic acid present in the system. In one embodiment an amount of at most 8 mol. % is used, preferably at most 5 mol. %. In one embodiment an amount of at most 2 mole is used. Much lower amounts are also envisaged, e.g., an amount of at most 1 mol. %, in particular at most 0.5 mol. %. If a strong acid is used, which is preferred in the present invention, it is preferably used in an amount of at least 0.01 mol. %, more in particular at least 0.03 mol. %. If the amount of strong acid that is used is too high, it is believed that there may be undesirable solubilisation of the metal, leading to contamination of the foil. If the amount of acid is too low, the particularly advantageous effect of this embodiment of the invention will not be obtained.

In one embodiment the strong acid is added to the reaction mixture. It may be added to the reaction mixture after it has been prepared, or it may be added to one of the two reactants, in particular to the glycerol, before the reactants are combined. It is preferred that the strong acid is mixed homogeneously through the reaction mixture, as it has been found that this improves the properties of the resulting foam.

In another embodiment, which may be carried out additionally or alternatively to the addition of strong acid to the reaction medium, the substrate is contacted with the strong acid before the reaction mixture is brought into contact with the substrate, i.e., in a separate step. This substrate pretreatment may be advantageous because it involves less contact between the strong acid and the reaction mixture. Another advantage of the pretreatment is that it can be done under conditions different from the conditions prevailing during the esterification reaction.

In the process according to the invention the reaction mixture is contacted with a substrate with a toplayer comprising one or more of metal, metal oxide, or metal halide. As indicated above, it has been found that the presence of a substrate of this type causes the polymer foam to have a regular structure, e.g. to consist of small, regular cells or to have a regular reticulated structure.

In one embodiment the substrate comprises a top layer of metal, metal oxide, and/or metal halide, wherein the metal may be any metal, e.g., iron, steel, aluminium, copper, zinc, lead, brass, tin, and alloys and other combinations thereof. In one embodiment a substrate is used which is of any metal mentioned above, including alloys and combinations thereof, such as galvanized steel with a zinc or tin top layer.

The use of aluminium and zinc in the top layer, or as material for the substrate is considered preferred at this point in time, for reasons of cost and effectiveness. It has been found that the use of these substrates results in a foam with a regular structure. The use of aluminium is considered particularly preferred. It is noted that the top layer of the substrate may be metallic, but may also contain metal oxides, and/or metal halides, e.g., after pretreatment with a halide-based strong acid.

In one embodiment, a substrate, in particular a metal substrate is used which is in the form of a flexible material. In one embodiment, the substrate is in the form of a foil, e.g., a foil with a thickness in the range of 1-500 micron, in particular in the range of 100-400 micron.

The foam will adhere to the metal substrate. Depending on the application it may be preferred if the substrate can be easily removed from the foam. If the substrate is a flexible material, this may easily be the case. For other applications, including but not limited to the manufacture of sandwich panels of metal and polymer foam, it is preferred not to remove the substrate from the foam.

The liquid mixture comprising glycerol, tri-carboxylic acid, and, preferably strong acid, is brought to reaction conditions. Reaction conditions include a temperature of at least 80° C., which is the temperature at which the reaction will start, as can be seen from an increase in viscosity in the reaction mixture.

Preferably, the reaction takes place at a temperature of 90-240° C., in particular 100-180° C. It has been found that the selection of a lower temperature, e.g., in the range of 90-140° C. will in general lead to the formation of a foam with closed cells, while the selection of a higher temperature will lead to the formation of a foam with a reticulated structure.

In one embodiment of the present invention the temperature of the reaction mixture is not elevated above 130° C. before a conversion of at least 90% has been obtained. The degree of conversion of at least 90% can be determined from the weight loss of the product, due to evaporation of water. In this embodiment It is preferred that the temperature of the reaction mixture is not elevated above 130° C. before a conversion of at least 95% has been obtained, more in particular a conversion of at least 98%. In one embodiment it is preferred for the temperature of the reaction mixture to be not elevated above 125° C. before a conversion of at least 90% has been obtained. A maximum temperature of 120° C. may be more preferred. In this embodiment is also preferred that temperatures above these values are not reached before a conversion of at least 95% has been obtained, more in particular a conversion of at least 98%. Selection of a suitable reaction temperature is a balance between reaction velocity, which is higher at higher temperatures, and reaction control, which is better at lower temperatures. With the guidance within the present specification it is within the scope of the skilled person to determine a suitable reaction temperature.

The reaction may be performed at atmospheric pressure, at superatmospheric pressure, and/or at reduced pressure, optionally with different pressure regimens being applied during different stages of the reaction. In one embodiment the reaction mixture is kept at a pressure below atmospheric pressure for at least part of the reaction time. It is believed that the use of reduced pressure will lead to a product with a lower density. In one embodiment a pressure is applied of at most 0.5 bar, in particular at most 0.1 bar. Lower pressures may also be used, e.g., a pressure of at most 50 mbar, or a pressure of at most 10 mbar. A pressure of at most 1 mbar may even be applied. When working under reduced pressure, the lower limit will generally be determined by the apparatus used.

It is preferred for the reaction to be carried out for at least part of the time above the boiling point of water, that is, above the point where the vapor pressure of the liquid equals the environmental pressure surrounding the liquid. When the reaction is carried out at atmospheric pressure it is therefore preferred for the reaction to be carried out at a temperature above 100° C., more in particular at 105° C. or higher. When the reaction is carried at reduced pressure within this embodiment, the reaction may be carried out at lower temperatures, e.g., a temperature of between 80° C. and 100° C. at a pressure in the ranges indicated above, e.g., at a pressure of 0.10 mbar. The polymerization time will depend on the polymerization temperature, and may vary between wide ranges. The minimum time to get a degree of polymerization of at least 90% may vary between wide ranges, depending in al. on temperature and pressure. The time may be as short as five minutes, or less, but it may also be longer than 5 minutes, such as at least 10 minutes, or at least 20 minutes, in particularly at least one hour, or longer, such as at least 2 hours. The maximum polymerization time is not critical, but generally a time above 7 days may be less attractive from a commercial point of view. In one embodiment, a range of 4 hours to 5 days may be mentioned.

Combinations of various temperature and pressure regimens may be envisaged.

In one embodiment the reaction mixture is kept at a temperature of between 100° C. and 130° C. for at least part of the period from the start of the reaction until a conversion of at least 90% is obtained. More specifically, it may be desirable to keep the reaction mixture at a temperature of between 100° C. and 130° C. for the entire period from the start of the reaction until a conversion of at least 90% is obtained.

In one embodiment, the glycerol and the tri-carboxylic acid are mixed at a temperature of 100-130° C. for a period of 5 minutes to one hour. The mixture is then poured into a mould and kept there at a temperature of 100-130° C., in particular 100-120° C., for a period of 12 hours to 72 hours, in particular 12-36 hours. At that point in time a degree of polymerization of more than 90% will have been obtained.

In another embodiment, glycerol and tri-carboxylic acid are mixed with water in an amount of, say 2-10 wt. %, calculated on the total of acid at a temperature in the range of 40-100° C., in particular 40-80° C. for a period of 5 minutes to one hour.

The mixture can then by poured in the mould and processed as described above.

The mixture obtained by either of the embodiments described can also be poured in a mould and kept at reduced pressure, e.g., at a pressure in the ranges as indicated above, in particular at a value below 1 mbar, e.g. below 0.5 mbar, for a period of 12-72 hours, at a temperature in the range of 80-130° C. If the foaming becomes excessive, e.g., when a relatively high temperature is used, it may be desirable to let off the pressure and then restore the vacuum, or to work at a higher, i.e. less reduced, pressure.

The rate of the polymerization may be increased by seeding the mixture with pulverized polymer particles as seed, e.g., in an amount of 1-30 wt. %, in particular 1-20 wt. %. It has been found that the use of polymer seeds leads to a product with a lower density as compared to a corresponding material manufactured in the absence of seeds. As the skilled person can easily determine, the polymer seed particles should be large enough to be easily suspended in the medium, but small enough to be able to act as seeds. A value of 3 mm may be mentioned as suitable maximum for the average particle diameter. A value of 0.025 mm may be mentioned as suitable minimum for the average particle diameter, although smaller particles may also be used. In one embodiment, the seeds may have an average particle size of less than 2 mm, in particular less than 1 mm, more in particular in the range of 0.1-0.7 mm. It is within the scope of the skilled person to determine a suitable amount of polymer seed and a suitable particle size, taking the above into account.

The polymer seeds may be of any polymer, in particular of any polyester. In one embodiment, the seeds are of a citric acid—glycerol polymer, in particular of a citric acid—glycerol polymer manufactured in accordance with the present specification (i.e. self-seeding). This has the advantage that the material that is obtained has a homogeneous chemical composition. In another embodiment, the seeds are of a polymer based on other monomers than citric acid or glycerol, either in addition to or instead of the citric acid and/or glycerol.

The step of combining the reactants to obtain a mixture will be carried out under mixing. The final stage of the polymerization, e.g., between a degree of polymerization of 70% and a degree of polymerization of 90% or higher will be carried out in the absence of a mixer, e.g., in a mould. The first stage of polymerization, e.g., until a degree of polymerization of 70% may be carried out while mixing. The absence of mixing is considered preferred, however.

It is preferred for the mixing and reaction stage to take place in an inert atmosphere, e.g., under nitrogen or argon, to prevent reaction of the polymer or the monomers with the oxygen from the air, which may result in yellowing of the polymer. It should be noted that once a degree of polymerization of 90% is reached, contacting the polymer with air will not cause problems anymore.

The polymer with a degree of conversion of 90% may be attractive for various purposes, in particular for those where a certain degree of biodegradability is desired, e.g., in packaging applications. However, in cases where a more stable material is desired, with a longer degradation time, a higher degree of polymerization may be more attractive. In this case, a degree of polymerization of at least 93%, at least 96%, or at least 98% may be aimed for. In general, the materials with a lower degree of conversion will be more flexible than materials with a higher degree of conversion.

The polymer of the present invention has a density of below 850 gram/l. The density will generally be above 50 g/l. In one embodiment, the density will be between 300 and 700 gram/l. Lower-density materials will be attractive for packaging applications. However, higher density materials may have better strength and better dimensional stability. In one embodiment the present invention is directed to polymers with a density of 500 to 850 g/l, in particular 550-700 g/l. In another embodiment, the polymer has a density in the range of 50 to 499 g/l, in particular in the range of 100-450 g/ml.

While not wishing to be bound by theory, two effects have been identified that may be relevant for the formation of the foam, which may act separately or in combination. A first effect of which it is believed that it may take place is that the water that is released during the esterification reaction may act as a propellant for the foam. A second effect of which it is believed that it may take place is that in the final stages of conversion the reaction of the glycerol with its specific structure with the tri-carboxylic acid with its specific structure may lead to the formation of a specific three-dimensional structure.

Taking these mechanisms into account, the density of the resulting polymer may be influenced as follows.

Performing the reaction at low pressure may decrease the density of the resulting polymer, e.g., application of a pressure in the ranges indicated for reduced pressure above, in particular below 1 mbar, more in particular below 0.05 mbar.

An important feature in obtaining a low density material is the selection of the shape of the mould in which the polymerization reaction takes place, or in other words, the thickness of the layer of the liquid composition when it is provided to the mould. If the thickness of the layer of reaction mixture when it is provided to the mould is relatively small, the water released during the polymerization has a relatively short pathway before it is released from the polymer, and its propellant activity will be less. If the layer thickness is larger, the water will have a longer way to travel, and the density of the resulting polymer will be lower. Depending on the desired object obtained, the thickness of the layer of reaction mixture when it is provided to the mould is at least 5 mm, more in particular at least 10 mm. The layer thickness may be much higher, e.g. at least 20 mm, or at least 50 mm, or at least 100 mm, or even at least 200 mm. The foamed final product will of course have a much larger height than the height of the layer of reaction mixture when it is provided to the mould.

Using an increased amount of water in the reaction medium may result in a material with a lower density. Water may, e.g., be added in an amount of at least 2 wt. % on the total of acid and glycerol. More specifically, water may be added in an amount between 2 and 10 wt. %.

Taking the above parameters into account it is within the scope of the skilled person to determine a preparation method that will result in a polymer with a density within the desired range.

The foam that can be obtained by the process according to the invention is a glycerol-tricarboxylic polyester with a regular distribution of small cells. It is noted that the surface layer of the foam, generally the top 10 mm, or the top 5 mm, may have a higher density than the rest of the foam. Depending on the further use of the foam, this may be an advantage, because it provides the foam with a built-in surface covering, or it may be a disadvantage where a more homogeneous structure is desired. The surface layer, comparable with a cake crust, can easily be removed through machining, to obtain a homogeneous product. The values for foam density and other foam parameters are determined on the foam not calculating the top layer.

In one embodiment the foam of glycerol-tricarboxylic polyester has a closed cell foam structure wherein at least 90 vol. % of the foam, preferably at least 95% of the foam, is built up from cells having a diameter below 2 mm. Preferably, at least 90 vol. % of the foam, preferably at least 95% of the foam, is built up from cells having a diameter below 1 mm, in particular below 0.5 mm, more in particular below 0.1 mm.

In one embodiment, the cells in the foam have a very homogeneous size distribution. In one embodiment, at least 70 number % of the cells have a diameter within +/−25% of the average cell diameter.

In another embodiment at least 70 volume % of the cells have a diameter within +/−25% of the average cell diameter. In a particular embodiment both the number % requirement and the volume % requirement are met.

The polymer aimed for is the reaction product of glycerol and a tri-carboxylic acid. Other components may be present in the reaction medium, but not to an extent that they substantially interfere with the nature of the reaction product. Suitable components that may be present include catalysts and colorants.

In general less than 20 wt. % of the reaction mixture should be made up of other components, preferably less than 15 wt. %, more preferably less than 10 wt. %. In some embodiments it may be preferred for the mixture to contain less than 5 wt. % of additional components, or even less than 2 wt. %. The above pertains to components which end up in the final product. Water, which is evaporated from the final product and other gaseous components that may be added, if any, are not included herein.

Accordingly, in one embodiment the present invention pertains to a process wherein the reaction mixture reacted to a degree of polymerization of at least 90% has a mass of at least 100 grams, in particular at least 200 grams, more in particular at least 500 grams. The actual size of the polymer object to be produced is not further limited, and may be as large as required. If so desired it can later be converted into suitable pieces.

The shortest distance between the centre of the object to be formed by the polymerization and the exterior of the object may be at least 2 mm, more in particular at least 4 mm, depending on the use.

The foamed polymer that may be manufactured by the process according to the invention has many uses.

Due to its environmentally friendly nature and biodegradability, including depolymerization in water, it may be attractive as packaging material. This goes in particular for the materials with a degree of polymerization of between 90% and 95% and/or a density below 500 grams/l. The fact that the material has a clean burning profile (no heteroatoms, no aromatics), the less biodegradable materials may also be attractive as packaging material. It should also be noted that the material is completely non-toxic.

The material according to the invention may be used as such, or in combination with other materials.

The material would be particularly attractive as packaging or decoration material for foodstuff and culinary exhibitions, because it allows the packaging and any remaining foodstuff to be disposed of without separation being necessary, as the polymer is biodegradable. It's non-toxic nature also makes it particularly suitable for foodstuff applications.

The material can also be used as insulation material, e.g., in buildings, but also in industrial or laboratory applications. Depending on the expected life cycle and conditions of use it may be desired for this material to have a degree of conversion of at least 95%, more in particular at least 97%, or higher as discussed above. The insulation material may have a thickness of at least 0.5 cm, in particular at least 1 cm.

It may be used as a layer in combination with layers of other materials.

The material can also be used in the manufacture a large variety of products with a relatively short life cycle, e.g., disposable products. Examples include toys for children which can be thrown away and biodegraded or burnt after use. A further example are objects for temporary installations, e.g., for exhibitions, film-sets etc. One embodiment could be the manufacture of biodegradable snowflakes.

The present invention is illustrated by the following non-limiting examples.

EXAMPLE 1

Citric Acid Monohydrate 2 kg (9.5 mol) was dissolved in 60 minutes in 1 liter (1.26 kg, 13.6 mol, glycerol:acid ratio 1.4:1) reagent grade glycerol, with stirring at 120° C. in a 3 liter glass beaker. Concentrated hydrochloric acid (37% in water, 50 ml, 6 mol. % calculated on citric acid) was added and stirring was continued for 15 minutes. The liquid, 2.5 liter, was poured into an aluminum tray (30*50 cm) and kept at 138° C. for 20 hrs in an oven. After cooling to room temperature the aluminum substrate was torn off from the rigid foam. The foam had an average thickness of 6 cm and a volume of 9 l with a weight of 2.6 kg. A machined sample of 10*2*3 cm was found to have a density of 376 mg/cc, a bending modulus of 115 Mpa (three point flexural test), and an average cell size of 0.1 mm with an empty volume of 72%. This foam is presented on the right-hand side in FIG. 1.

EXAMPLE 2

Citric Acid Monohydrate 1 kg was dissolved within 60 minutes in 725 ml (888 gr) 90% aqueous solution of glycerol (molar ratio alcohol:acid 1.8:1) at 100° C. Concentrated hydrochloric acid (37% in water, 2 ml, 3.6 mol % calculated on citric acid) was added and stirring continued for 15 minutes. The resin, 1.5 liter, was poured into an aluminum tray (30*50 cm) yielding a liquid layer with a thickness of 1 cm. The tray was kept in an oven at 142° C. for 20 hrs. After cooling to room temperature the metal was torn off from the greyish brittle foam weighing 1452 gr having an estimated volume of 4.5 l at an average density of 322 mg/cc. The foam was covered with a smooth leathery polyester layer with a thickness of 2-3 mm to imitate furnishing covering.

Upon standing in ambient humid atmosphere, the weight increases from 1452 to 1572 gr—an increase of 9%—over a period of 5-7 days and the brittle foam became elastic. This makes it suitable for use in applications where a softer foam is desired.

EXAMPLE 3

Citric Acid Monohydrate 1 kg was dissolved in 500 ml (600 gr) of a 90% aqueous solution of glycerol in water with stirring at 120° C. in a glass beaker. The glycerol:CA molar ratio was 1.2:1. Concentrated hydrochloric acid (37% in water, 40 ml, 6 mol % calculated on citric acid) was added and stirring continued for 15 minutes. The warm liquid with a volume of 1 liter was poured in an aluminum tray (30*50 cm) and kept in an oven at 160 C for 3 hours. After cooling to room temperature the aluminum metal was removed and 1003 gr of an off-white freestanding foam with an estimated volume of 3 l was obtained. A machined sample of 10*2*3 cm was found to have a density of 291 mg/cc a bending modulus of 37 MPa, an average cell size of 0.1-0.12 mm and 80.19% empty volume.

The rigid foam can be irreversibly deformed after heating to 130 C followed by cooling after deformation.

EXAMPLE 4

Citric Acid monohydrate (400 gram) was dissolved in 260 89-91% solution of glycerol in water by heating with stirring at 120° C. for 30 minutes (glycerol:acid molar ratio is 1.3:1). Concentrated hydrochloric acid (40 ml, 6 mol % calculated on citric acid) was added and stirring continued for 10 minutes. A portion of the resin was poured in a horizontal zinc metal tray (14*20 cm) to reach 1 cm thickness with a volume of 280 ml. Formation of a white milky liquid was immediate. The tray was kept for 20 hrs in an oven at 138° C. under nitrogen flow. After cooling to room temperature the slightly yellow rigid foam was removed from the metal. A rectangular slab of 8*2*2 cm was machined and found to have a density of 482 mg/cc and a bending modulus of 148 Mpa.

EXAMPLE 5

A portion of 280 ml of the resin foam obtained in Example 4 (14*20*1 cm) was kept in an oven at 145 C for 20 hrs in a zinc tray. After cooling the rigid slightly yellow foam was removed from the metal and found to have a density of 282 mg/cc and a bending modulus of 45 Mpa.

COMPARATIVE EXAMPLE A

Citric Acid Monohydrate 420 gram (2 mol) was heated with stirring with 186 gram (2 mol, molar ratio 1:1) reagent grade glycerol in a glass vessel for 30 minutes until a temperature of 120 C is reached. 2 ml concentrated HCl (37% in water), 0.2% molar based on citric acid was added and the viscous hot liquid was poured in a 30*10 cm silicone rubber tray (6 cm height). The tray was kept in an oven at 140 C for 20 hrs.

After cooling a white reticular foam with irregular cell size of 2-5 mm was obtained, as can be seen in the left-hand side foam in FIG. 1.

The invention claimed is:

1. Process for manufacturing a glycerol-tricarboxylic acid polyester foam, comprising combining glycerol and a tricarboxylic acid to provide a liquid reaction mixture and contacting the reaction mixture with a substrate under polymerization conditions, wherein the substrate has a top layer comprising one or more of metal, metal oxide, and metal halide.

2. The process according to claim 1, wherein the tricarboxylic acid is citric acid.

3. The process according to claim 1, wherein a strong acid is added to the reaction mixture and/or wherein a strong acid is applied to the substrate prior to contacting the reaction mixture with the substrate.

4. The process according to claim 3, wherein the strong acid is selected from one or more of hydrochloric acid HCl, hydroiodic acid (HI), hydrobromic acid (HBr), perchloric acid $HClO_4$, nitric acid $HNO_3$, sulfuric acid $H_2SO_4$, triflic acid, and trihaloacetic acid.

5. The process according to claim 3, wherein the strong acid is used in an amount of at most 10 mol. %, calculated on the total moles tricarboxylic acid present in the system.

6. The process according to claim 1, wherein the substrate comprises a top layer of metal, metal oxide, and/or metal halide, wherein the metal is selected from iron, steel, aluminium, copper, zinc, lead, brass, tin, and alloys and other combinations thereof.

7. The process according to claim 1, wherein the substrate is in the form of a flexible metal material.

8. The process according to claim 1, wherein the reaction is carried out for at least part of the time above the boiling point of water, that is, above the point where the vapor pressure of the liquid equals the environmental pressure surrounding the liquid.

9. The process according to claim 1, wherein the reaction mixture is seeded with pulverized polymer particles as seed.

10. The process according to claim 1, wherein water is added to the reaction mixture in an amount of at least 2 wt. % on the total of acid and glycerol.

11. The process according to claim 1, wherein the reaction is carried out in the absence of catalyst.

12. The process of claim 5, wherein the strong acid is used in an amount of at most 8 mol. % calculated on the total moles tricarboxylic acid present in the system.

13. The process of claim 7, wherein the flexible metal material is a metal foil.

14. The process of claim 13, wherein the metal foil has a thickness in the range of 1-500 microns.

15. The process of claim 9, wherein the mixture is seeded with pulverized polymer particles in an amount of 1-30 wt. %.

\* \* \* \* \*

UNITED STATES PATENT AND TRADEMARK OFFICE
CERTIFICATE OF CORRECTION

PATENT NO. : 10,280,276 B2
APPLICATION NO. : 14/378770
DATED : May 7, 2019
INVENTOR(S) : Gad Rothenberg and Albert Hendrikus Alberts It is certified that error appears in the above-identified patent and that said Letters Patent is hereby corrected as shown below:

In the Claims

In Column 10, Claim 4, Lines 42-44, please delete "hydrochloric acid HCl, hydroiodic acid (HI), hydrobromic acid (HBr), perchloric acid HClO$_4$, nitric acid HNO$_3$, sulfuric acid H$_2$SO$_4$" and insert -- hydrochloric acid (HCl), hydroiodic acid (HI), hydrobromic acid (HBr), perchloric acid (HClO$_4$), nitric acid (HNO$_3$), sulfuric acid (H$_2$SO$_4$), --

Signed and Sealed this
Twenty-ninth Day of October, 2019

Andrei Iancu
*Director of the United States Patent and Trademark Office*